United States Patent Office 2,784,611
Patented Mar. 12, 1957

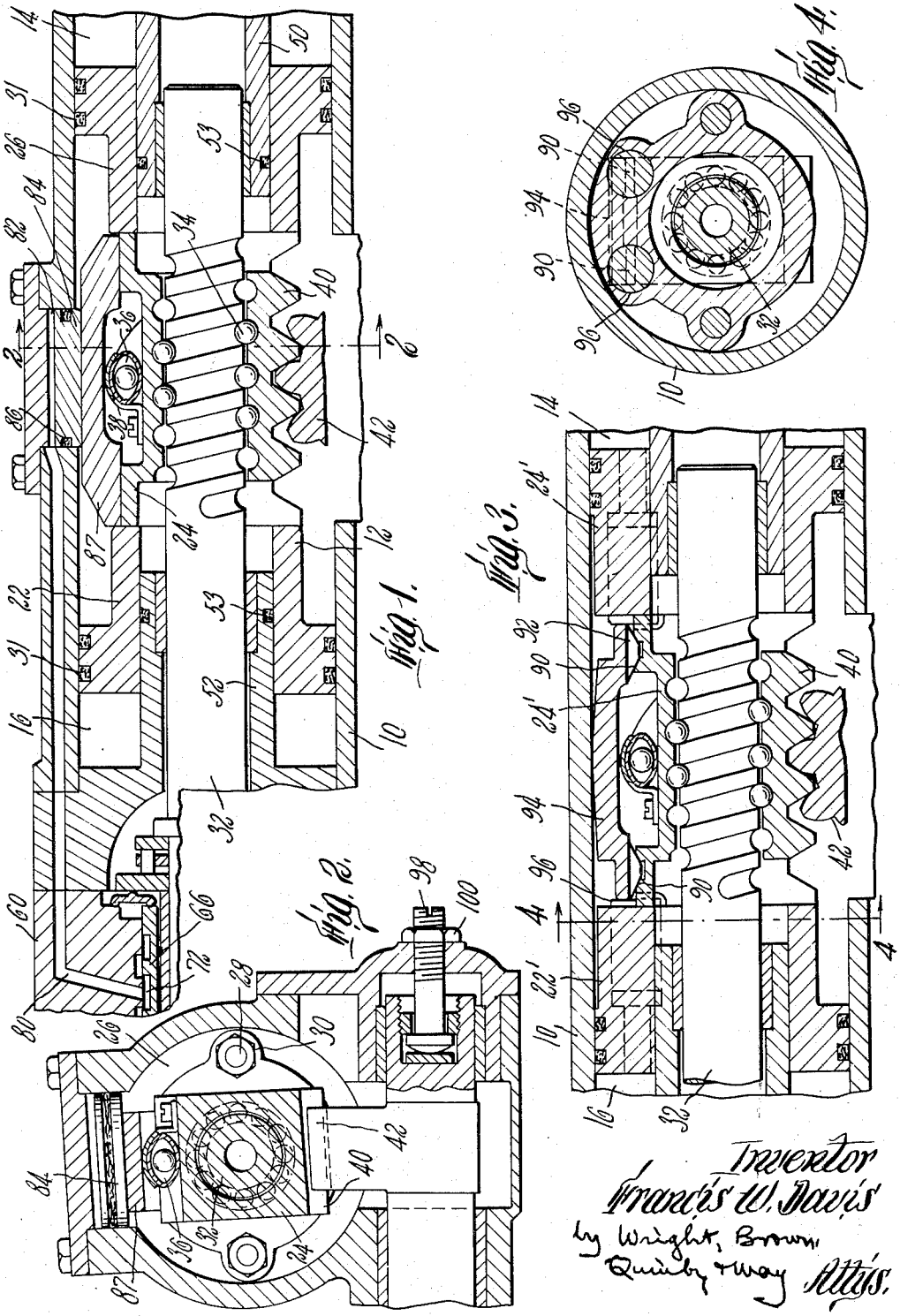

2,784,611

FLUID POWER STEERING GEAR

Francis W. Davis, Belmont, Mass.

Application August 25, 1953, Serial No. 376,327

2 Claims. (Cl. 74—388)

This application is a continuation-in-part of my co-pending application Serial No. 225,849, filed May 11, 1951. The invention relates to a fluid power steering gear including a servo-motor of the type described and illustrated in U. S. Patent No. 2,410,049 granted to me October 29, 1946. The fluid motor comprises a cylinder which is a part of the steering column and is coaxial with the steering post, and a piston slidably mounted in the cylinder, fluid under pressure being admitted into either end of the cylinder to press against the corresponding end of the piston to cause the piston to slide in the desired direction. One of the objects of the present invention is to provide a three-part piston, the mid part of which is a nut which has a rack on its outer surface to mesh with a gear sector. This mid part has a floating connection with the end parts so that no transverse force is impressed on the latter. The nut is in threaded engagement with a steering post which extends therethrough, and the gear sector with which the rack meshes is on a cross shaft which may be connected in the usual manner to the vehicle wheels to be deflected to direct the course of the vehicle. Power fluid, preferably a liquid such as oil, is supplied in the usual manner to a control valve which is in the steering column. The steering post, which is manually rotated to steer the vehicle, is at the axis of the column and extends down through the control valve as well as the piston. Rotation of the steering post thus results in axial movement of the piston which in turn results in rocking movement of the cross shaft. The reactive axial thrust on the steering post from the piston when the steering post is rotated, tends to move the post axially. The post is capable of such movement for a small distance in either direction from a "neutral" position, such axial movement of the post being opposed by suitable "centering means" which yieldingly tend to prevent axial movement of the post in either direction from its normal position relative to the casing of the steering column. The control valve for the motor consists chiefly of two cooperating members one of which is stationary and may be a part of the steering column casing itself, the other or inner member being nested and axially slidable in the outer member a limited distance to vary the several valve ports formed by grooves in the two members. The inner valve member is moved by axial movement of the steering post.

The centering means hereinbefore referred to opposes axial movement of the steering post and of the movable valve member with respect to the stationary valve member unless and until the driven part (such as the cross-shaft) offers sufficient resistance to movement in response to torque exerted on the steering post to overcome the opposition of the centering means, whereupon the steering post moves axially and the valve is thus operated to direct the power fluid into one end or the other of the cylinder so as to produce axial follow-up movement in the piston which will restore the steering post and movable valve member axially to their neutral positions. Thus the steering mechanism is a manually operated steering gear until resistance to the steering effort exceeds a predetermined value, whereupon power assistance is instantly and automatically called into action. When the valve-centering means is actuated by springs only, the magnitude of the resisting force which must be exceeded to bring the power actuation into play depends on the physical characteristics of the springs. The centering effect of the springs may be augmented by pressure derived from the power fluid entering the control valve. A centering means of this kind is described in my Patent No. 1,937,470, granted November 28, 1933.

According to the present invention, the fluid pressure which is built up in the supply line from the pump when power is called into play in response to excessive road resistance is also utilized to oppose and balance the lateral thrust on the mid part of the piston resulting from a camming effect of the gear sector which meshes with the rack teeth on said mid part.

For a more complete understanding of the invention, reference may be had to the following description of certain embodiments thereof, and to the drawing, of which—

Figure 1 is a fragmentary sectional view of a steering mechanism embodying the invention;

Figure 2 is a section on the line 2—2 of Figure 1;

Figure 3 is a sectional view of a modified form of the invention; and

Figure 4 is a section on the line 4—4 of Figure 3.

Figure 1 shows in section the lower portion of a steering column of an automobile, embodying the invention. At the lower end of the column is a casing member 10 which serves as the cylinder of a fluid motor. A piston 12 is slidably fitted in the casing member 10, this piston forming chambers 14 and 16 within the cylinder between the ends of the piston and the respective ends of the casing. The piston 12 is composed of three members 22, 24, and 26. The members 22 and 26 are end members and are secured to the central member 24 by suitable studs 28 and nuts 30 as indicated in Figure 2. The studs pass through holes in the central member 24 which are large enough to leave a little clearance, and are screw threaded into holes in the end members 22 or 26. The nuts 30 are set up tight enough to insure that the three parts reciprocate as a unitary piston but not so tight as to prevent transverse self-adjustment of the center member 24 which is thus allowed to float with respect to the end members. The end members 22 and 26 are provided with packing rings 31 to prevent leakage from the chambers 14 and 16 along the outer surface of these members.

The center member 24 is a nut having a central bore, and is operatively related to a steering post 32 which extends down through the piston coaxially with the casing 10, the connection being of the worm and nut type. In order to minimize friction, the interfaces of the nut 24 and the steering post 32 are helically grooved to accommodate a series of ball bearings 34 which run in these grooves when the steering post is rotated. A return tube 36 is secured to the mid member by a strap 38 so as to transfer the balls which approach one end of the grooved portion of the steering post to a point near the other end of the grooved portion of the steering post. In the embodiment of the invention shown in the drawings, the nut 24 is a ball nut. This nut is externally rectangular, as indicated in Figure 2, a series of gear teeth 40 being formed on one face thereof, these teeth constituting a rack which meshes with a gear sector 42. This gear sector is secured to or is integral with a cross-shaft which is connected to the vehicle wheels in such a way as to deflect them when it is rocked in one direction or the other.

The portions of the steering post 32 immediately below and above the nut 24 are fitted in tubular bearing members 50 and 52 which project toward each other and are integral respectively with the cylinder ends 18 and 20. The end members of the piston are slidably fitted on the outer surfaces of the bearing members 50 and 52, and packing rings 53 are provided to prevent leakage along these surfaces from the chambers 14 and 16.

When the steering post is turned for the purpose of deflecting the vehicle wheels, the worm connection between the post and the ball nut 24 results in a reaction force having an axial component which tends to move the lower portion 32 of the steering post up or down in the direction of its axis according to the direction of rotation of the post. Suitable yielding means are provided to resist such axial movement of the post. If the resistance to steering effort overcomes the force provided for opposing axial movement of the post, then a control valve is operated in such a manner as to direct power fluid into the chamber 14 or the chamber 16 so as to move the piston axially in a direction to restore the post 32 to its normal position.

The control valve by which the power fluid is directed into one or the other of the chambers 14 and 16 is partly shown in Figure 1 and is more completely shown and described in the said Patent No. 2,410,049. The movable valve member is a hollow cylinder 66 having three circumferential grooves on its outer surface which lap and communicate with cooperating grooves on the inner surface of the casing 60 in which the valve member is slidably fitted. The middle groove 72 in the valve member is constantly in communication with the pump (not shown) which supplies the power fluid. Hence when the power mechanism is called upon to operate, the pressure of the fluid in the groove 72 builds up and is communicated to the chamber 14 or 16 by passages not shown.

When power is applied to overcome a road resistance of considerable magnitude, there is a correspondingly great interfacial pressure between flanks of the mutually engaged teeth of the gear sector 42 and the rack 40, which pressure has a substantial component transverse to the axis of the steering post 32. The purpose of the tubular bearing members 50 and 52, according to the invention, is to take this thrust and prevent the piston 12 from bearing heavily against the inner wall of the cylinder 10 as it moves back and forth. Furthermore, according to the invention, an arrangement is provided whereby the transverse thrust on the piston is opposed and approximately balanced so as to minimize wear on all the bearing surfaces within the cylinder.

For this purpose the fluid pressure which builds up in the inlet groove 72 when road resistance is encountered is utilized. Such pressure is instantly communicated through a passage 80 to a chamber 82 where it acts on the head of a flat auxiliary piston 84 which is preferably provided with the usual sealing ring 86. The piston 84 bears on a spacer 87 which in turn bears on the side of the nut 24 opposite to the gear sector 42, thus counteracting the component of thrust on the rack teeth 40 which is transverse to the axis of the steering post 32. Since the forces on the teeth 40 and on the piston 84 both result from the same liquid pressure, they can be made to balance each other approximately by designing the piston 84 with the appropriate area of surface exposed to liquid pressure.

A modified form of this feature of the invention is shown in Figures 3 and 4. In this form the nut 24' has sloping cam surfaces 90 engaged by four cam elements 92 carried by a plate 94, two at each end of the plate. Aligned with the cam elements are four plungers 96 which slide in bores in the piston parts 22' and 24' which are in communication with one or the other of the chambers 14 and 16. When liquid pressure builds up in either of these chambers, it presses on the corresponding pair of plungers 96 to tend to displace the plate 94 longitudinally and thus to exert transverse force on the nut through the cams 92 to oppose the transverse components of the thrust on the rack teeth 40.

It is desirable to avoid as far as possible any backlash or looseness in the steering connections, including the meshing of the rack teeth with the gear sector. For this purpose the teeth of the rack and sector are slightly inclined with reference to the axis of the cross-shaft, as indicated in Figure 2. Hence, by adjusting the cross-shaft axially, any slack or back-lash between the gear sector and the ball nut can be eliminated. To hold the cross-shaft in any axially adjusted position, an end of the shaft is recessed and the head of a bolt 98 is snugly retained in the recess, relative axial movement between the bolt and shaft being prevented, but relative rocking movement being permitted. The bolt is threaded through a hole in the housing so that rotation thereof results in axial movement of the shaft 44. A lock nut 100 retains the bolt in position of adjustment.

I claim:

1. In a fluid power steering gear, a cylinder with a chamber at each end for power fluid, a piston reciprocable in said cylinder, said piston having a mid portion comprising a nut with rack teeth on one side thereof, a gear sector with teeth meshing with said rack teeth, said cylinder having a lateral opening through which said gear sector extends, a cross shaft on which said gear sector is mounted to be rocked by reciprocation of said piston, and fluid-operated means for exerting pressure on the side of said nut opposite to the rack teeth, whereby to oppose the transverse component of force on the nut resulting from the camming effect on the mutually engaged flanks of the rack teeth and gear sector teeth when fluid power is applied through the piston to rock the cross shaft.

2. Apparatus as in claim 1, said fluid-operated means including an auxiliary piston opposite said nut and reciprocable transversely to the axis thereof, and means directing against said auxiliary piston fluid from the source supplying fluid under pressure to one of said chambers.

References Cited in the file of this patent

UNITED STATES PATENTS

| | | |
|---|---|---|
| 2,587,495 | MacDuff | Feb. 26, 1952 |
| 2,605,854 | MacDuff | Aug. 5, 1952 |